(12) United States Patent
Churchill

(10) Patent No.: US 11,420,736 B1
(45) Date of Patent: Aug. 23, 2022

(54) SYSTEM AND METHOD FOR VIBRATION MONITORING OF AN ELECTRIC AIRCRAFT

(71) Applicant: BETA AIR, LLC, South Burlington, VT (US)

(72) Inventor: David Churchill, South Burlington, VT (US)

(73) Assignee: BETA AIR, LLC, South Burlington, VT (US)

(*) Notice: Subject to any disclaimer, the term of this patent is extended or adjusted under 35 U.S.C. 154(b) by 0 days.

(21) Appl. No.: 17/515,430

(22) Filed: Oct. 30, 2021

(51) Int. Cl.
*B64C 29/00* (2006.01)
*B64D 27/24* (2006.01)
*G06N 20/00* (2019.01)
*B64D 27/02* (2006.01)

(52) U.S. Cl.
CPC .......... *B64C 29/0008* (2013.01); *B64D 27/24* (2013.01); *B64C 2201/04* (2013.01); *B64D 2027/026* (2013.01); *G06N 20/00* (2019.01)

(58) Field of Classification Search
CPC . B64C 29/0008; B64C 2201/04; B64D 27/24; B64D 2027/026; G06N 20/00
See application file for complete search history.

(56) References Cited

U.S. PATENT DOCUMENTS

| | | | | |
|---|---|---|---|---|
| 5,383,133 A * | 1/1995 | Staple | ...................... | G01H 1/00 340/963 |
| 10,607,424 B2 * | 3/2020 | Batcheller | .............. | B64D 45/00 |
| 10,657,735 B2 * | 5/2020 | Tucker | ...................... | B64F 5/60 |
| 10,826,752 B2 * | 11/2020 | Schwindt | ................ | H04L 67/12 |
| 11,142,333 B1 * | 10/2021 | Richter | .................. | B64D 27/24 |
| 2012/0035885 A1 * | 2/2012 | Tarassenko | ............ | G01H 1/006 702/183 |
| 2016/0236790 A1 * | 8/2016 | Knapp | ................. | G08G 5/0052 |
| 2019/0011934 A1 * | 1/2019 | DeBitetto | .............. | G05D 1/102 |
| 2019/0064034 A1 * | 2/2019 | Fayfield | ................ | G01M 15/12 |
| 2019/0384297 A1 * | 12/2019 | Hehn | ..................... | B64C 39/024 |
| 2020/0026269 A1 * | 1/2020 | Needham | ................ | H02P 23/14 |

(Continued)

FOREIGN PATENT DOCUMENTS

| | | | | |
|---|---|---|---|---|
| CN | 108910077 A | | 11/2018 | |
| EP | 3222510 A1 * | 9/2017 | ............. | B64D 35/02 |

(Continued)

OTHER PUBLICATIONS

Yap et al., Structural Health Monitoring for Unmanned Aerial Systems, May 14, 2014.

(Continued)

*Primary Examiner* — Behrang Badii
*Assistant Examiner* — Jalal C Coduroglu
(74) *Attorney, Agent, or Firm* — Caldwell Intellectual Property Law

(57) ABSTRACT

In an aspect, a system for vibration monitoring of an electric aircraft. A system include a propulsor. A system includes a sensor coupled to a propulsor. A sensor is configured to measure a vibration datum of a propulsor and transmit the vibration datum to a flight controller. A flight controller is configured to receive a vibration datum from a sensor. A flight controller is configured to generate a throttle datum as a function of a vibration datum. A flight controller is configured to transmit a throttle datum to a propulsor.

20 Claims, 7 Drawing Sheets

(56) References Cited

U.S. PATENT DOCUMENTS

| | | | | |
|---|---|---|---|---|
| 2020/0189722 A1* | 6/2020 | Duffy | ............... | B64C 27/001 |
| 2020/0290742 A1* | 9/2020 | Kumar | ............... | B64D 27/24 |
| 2020/0317367 A1* | 10/2020 | Clampitt, III | ........ | G07C 5/0808 |
| 2020/0391876 A1* | 12/2020 | Morrison | ............... | B64D 33/08 |
| 2020/0398992 A1* | 12/2020 | Morrison | .......... | H01M 8/04029 |
| 2021/0253246 A1* | 8/2021 | Tibbitts | ................ | B64C 1/1484 |

FOREIGN PATENT DOCUMENTS

| | | | | |
|---|---|---|---|---|
| EP | 3598633 A1 * | 1/2020 | ........... | G01R 31/343 |
| WO | WO-2015138217 A1 * | 9/2015 | ......... | B64C 29/0033 |
| WO | WO-2016093905 A1 * | 6/2016 | ............. | B64D 27/24 |
| WO | WO-2016179667 A1 * | 11/2016 | ........... | B64C 39/024 |
| WO | WO-2019190263 A1 * | 10/2019 | ............. | B64C 27/28 |
| WO | WO-2019241768 A1 * | 12/2019 | ............. | B64D 47/08 |
| WO | 2020245305 | 12/2020 | | |

OTHER PUBLICATIONS

Bektash et al., Vibration Analysis for Anomaly Detection in Unmanned Aircraft, Dec. 31, 2020.
Ni et al., Simulation Analysis of Mechanical Property of Aircraft Throttle Controller, Dec. 31, 2020.

* cited by examiner

SYSTEM AND METHOD FOR VIBRATION MONITORING OF AN ELECTRIC AIRCRAFT

FIELD OF THE INVENTION

The present invention generally relates to the field of vibration monitoring in an electric aircraft. In particular, the present invention is directed to a system and method for vibration monitoring of a propulsor of an electric aircraft.

BACKGROUND

Modern electric aircraft may have a plurality of flight components such as propulsors. Propulsors may experience vibrational forces in flight. Vibrational forces may damage propulsors of an electric aircraft which may degrade performance of an electric aircraft. Systems and methods for monitoring of a propulsor of an electric aircraft are inefficient and could be improved.

SUMMARY OF THE DISCLOSURE

In an aspect, a system for vibration monitoring of an electric aircraft. A system include a propulsor. A system includes a sensor coupled to a propulsor. A sensor is configured to measure a vibration datum of a propulsor and transmit the vibration datum to a flight controller. A flight controller is configured to receive a vibration datum from a sensor. A flight controller is configured to generate a throttle datum as a function of a vibration datum. A flight controller is configured to transmit a throttle datum to a propulsor.

In an aspect, a method of monitoring health of an electric aircraft. A method includes measuring on a sensor a vibration datum of a propulsor. A method includes transmitting by a sensor a vibration datum to a flight controller. A method includes modifying via a flight controller a throttle datum of a propulsor as a function of a vibration datum. A method includes transmitting by a flight controller a throttle datum to a propulsor. A throttle level of a propulsor is adjusted based on a throttle datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
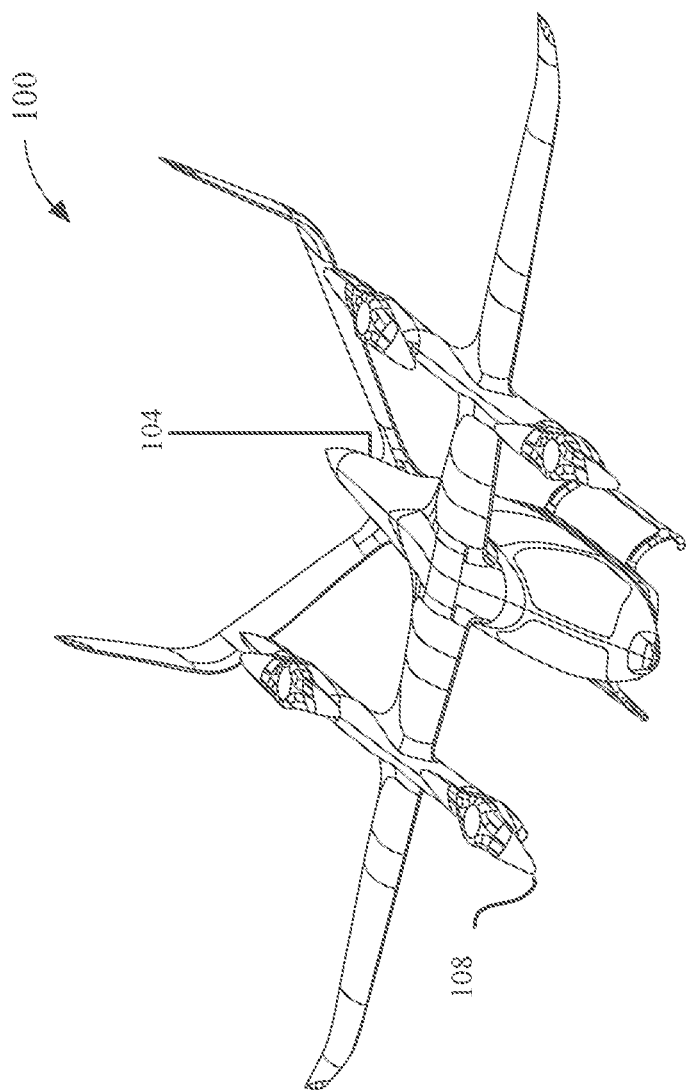
FIG. 1 is a front view of an exemplary embodiment of an electric aircraft.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

Described herein is a system for health monitoring of an electric aircraft. In some embodiments, an electric aircraft may include an eVTOL. In other embodiments, an electric aircraft may include an unmanned aerial vehicle. In other embodiments, an electric aircraft may include a drone. In some embodiments, a system may include a propulsor. A propulsor may include an electric motor. In some embodiments, a propulsor may include a vertical or horizontal propulsor. In some embodiments, a propulsor may be configured to generate lift. In some embodiments, a propulsor may be configured to generate thrust. A system may include a sensor coupled to a propulsor. In some embodiments, a sensor may include an inertial measurement unit (IMU). In some embodiments, a sensor may be configured to measure a vibration datum of a propulsor. A vibration datum may include data of a plurality of mechanical forces acting on a propulsor. In some embodiments, a vibration datum may include a resonant frequency of a propulsor. In some embodiments, a sensor may be configured to transmit a vibration datum to a flight controller. In some embodiments, a flight controller may be configured to receive a vibration datum from a sensor. A flight controller may be configured to modify a throttle datum. In some embodiments, a flight controller may be configured to modify a throttle datum as a function of a vibration datum. In some embodiments, a flight controller may be configured to update a throttle datum based on a resonant frequency of a propulsor. In some embodiments, a throttle datum may include an operational throttle level of a propulsor. In some embodiments, a flight controller may be configured to modify a throttle datum based on a vibration datum threshold. In some embodiments, a throttle level of a throttle datum may be reduced when a vibration datum threshold may be reached. In some embodiments, a flight controller may be configured to transmit a throttle datum to a propulsor. In some embodiments, transmitting a throttle datum to a propulsor may include adjusting a throttle level of the propulsor. In some embodiments, a flight controller may be configured to utilize a machine learning model. A flight controller may be configured to utilize a machine learning model to modify a throttle datum.

Described herein is a method of monitoring health of an electric aircraft. In some embodiments, an electric aircraft may include an eVTOL. In other embodiments, an electric aircraft may include an unmanned aerial vehicle. In other embodiments, an electric aircraft may include a drone. In some embodiments, a method includes measuring a vibration datum of a propulsor. A vibration datum may include a plurality of mechanical forces acting on a propulsor. In some embodiments, a vibration datum may include a vibrational threshold datum. In some embodiments, a vibration datum may include a resonant frequency of a propulsor. In some embodiments, measuring a vibration datum of a propulsor may include measuring a vibration datum on a sensor. In some embodiments, a sensor may include an inertial measurement unit. In some embodiments, a method includes modifying by a flight controller a throttle datum of a propulsor. In some embodiments, a throttle datum may include an operational throttle level of a propulsor. In some embodiments, a throttle datum may be modified as a function of a vibration datum. In some embodiments, a throttle datum may be updated based on a resonant frequency of a propulsor. In some embodiments, a method includes transmitting by a flight controller a throttle datum to a propulsor. In some embodiments, a throttle level of a propulsor may be adjusted based on a throttle datum. In some embodiments, a throttle level of a throttle datum may be reduced when a vibration datum threshold may be reached. In some embodiments, a flight controller may utilize a machine-learning model. A flight controller may be configured to utilize a machine learning model to modify a throttle datum.

Referring now to FIG. 1, an illustration of an exemplary embodiment of an aircraft 100 is shown. In some embodiments, aircraft 100 may include an electric aircraft. In some embodiments, aircraft 100 may include a vertical takeoff and landing aircraft (eVTOL). As used herein, a vertical take-off and landing (eVTOL) aircraft is one that may hover, take off, and land vertically. An eVTOL, as used herein, is an electrically powered aircraft typically using an energy source, of a plurality of energy sources to power the aircraft. In order to optimize the power and energy necessary to propel the aircraft. An eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 1, a number of aerodynamic forces may act upon the electric aircraft 100 during flight. Forces acting on an aircraft 100 during flight may include, without limitation, thrust, the forward force produced by the rotating element of the aircraft 100 and acts parallel to the longitudinal axis. Another force acting upon aircraft 100 may be, without limitation, drag, which may be defined as a rearward retarding force which is caused by disruption of airflow by any protruding surface of the aircraft 100 such as, without limitation, the wing, rotor, and fuselage. Drag may oppose thrust and acts rearward parallel to the relative wind. A further force acting upon aircraft 100 may include, without limitation, weight, which may include a combined load of the electric aircraft 100 itself, crew, baggage, and/or fuel. Weight may pull aircraft 100 downward due to the force of gravity. An additional force acting on aircraft 100 may include, without limitation, lift, which may act to oppose the downward force of weight and may be produced by the dynamic effect of air acting on the airfoil and/or downward thrust from the propulsor of the electric aircraft. Lift generated by the airfoil may depend on speed of airflow, density of air, total area of an airfoil and/or segment thereof, and/or an angle of attack between air and the airfoil. For example, and without limitation, aircraft 100 are designed to be as lightweight as possible. Reducing the weight of the aircraft and designing to reduce the number of components is essential to optimize the weight. To save energy, it may be useful to reduce weight of components of an aircraft 100, including without limitation propulsors and/or propulsion assemblies. In an embodiment, the motor may eliminate need for many external structural features that otherwise might be needed to join one component to another component. The motor may also increase energy efficiency by enabling a lower physical propulsor profile, reducing drag and/or wind resistance. This may also increase durability by lessening the extent to which drag and/or wind resistance add to forces acting on aircraft 100 and/or propulsors.

Referring still to FIG. 1, aircraft 100 may include at least a vertical propulsor 104 and at least a forward propulsor 108. A forward propulsor is a propulsor that propels the aircraft in a forward direction. Forward in this context is not an indication of the propulsor position on the aircraft; one or more propulsors mounted on the front, on the wings, at the rear, etc. A vertical propulsor is a propulsor that propels the aircraft in an upward direction; one of more vertical propulsors may be mounted on the front, on the wings, at the rear, and/or any suitable location. A propulsor, as used herein, is a component or device used to propel a craft by exerting force on a fluid medium, which may include a gaseous medium such as air or a liquid medium such as water. At least a vertical propulsor 104 is a propulsor that generates a substantially downward thrust, tending to propel an aircraft in a vertical direction providing thrust for maneuvers such as without limitation, vertical take-off, vertical landing, hovering, and/or rotor-based flight such as "quad-copter" or similar styles of flight.

With continued reference to FIG. 1, at least a forward propulsor 108 as used in this disclosure is a propulsor positioned for propelling an aircraft in a "forward" direction; at least a forward propulsor may include one or more propulsors mounted on the front, on the wings, at the rear, or a combination of any such positions. At least a forward propulsor may propel an aircraft forward for fixed-wing and/or "airplane"-style flight, takeoff, and/or landing, and/or may propel the aircraft forward or backward on the ground. At least a vertical propulsor 104 and at least a forward propulsor 108 includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contrarotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors may include at least a motor mechanically coupled to the at least a first propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element.

With continued reference to FIG. 1, during flight, a number of forces may act upon the electric aircraft. Forces acting on an aircraft 100 during flight may include thrust, the forward force produced by the rotating element of the aircraft 100 and acts parallel to the longitudinal axis. Drag may be defined as a rearward retarding force which is caused by disruption of airflow by any protruding surface of the aircraft 100 such as, without limitation, the wing, rotor, and fuselage. Drag may oppose thrust and acts rearward parallel to the relative wind. Another force acting on aircraft 100 may include weight, which may include a combined load of the aircraft 100 itself, crew, baggage and fuel. Weight may pull aircraft 100 downward due to the force of gravity. An additional force acting on aircraft 100 may include lift, which may act to oppose the downward force of weight and may be produced by the dynamic effect of air acting on the airfoil and/or downward thrust from at least a propulsor. Lift generated by the airfoil may depends on speed of airflow, density of air, total area of an airfoil and/or segment thereof, and/or an angle of attack between air and the airfoil.

Figure 2:
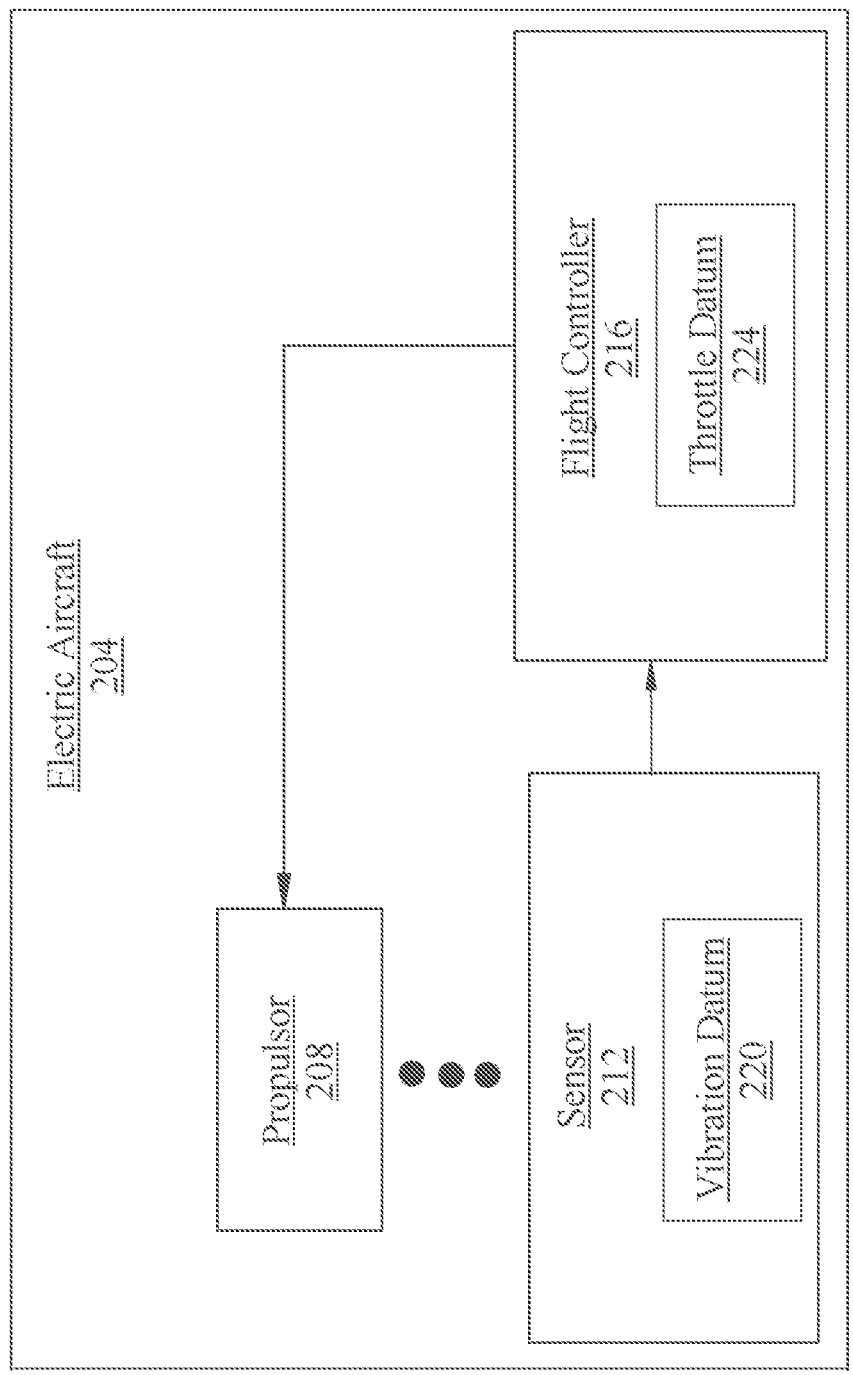
FIG. 2 is a block diagram of an exemplary embodiment of a health monitoring system.

Now referring to FIG. 2, a system 200 for vibration monitoring of an electric aircraft 204 is presented. In some embodiments, system 200 may include a propulsor receiving a throttle datum and adjusting a throttle level of as a function of the throttle datum. In some embodiments, system 200 may include an electric vertical takeoff and landing aircraft (eVTOL). In some embodiments, system 200 may include a vibration datum. A vibration datum may include physical force data. A vibration datum may include a frequency datum. In some embodiments, system 200 may include a flight controller configured to generate a throttle datum as a function of a frequency datum. In some embodiments, system 200 may include generating a throttle datum that may include detecting a vibration datum threshold. System 200 may include generating on a flight controller a throttle datum as a function of a vibration datum threshold. In some embodiments, system 200 may include generating on a flight controller a throttle datum as a function of a vibration datum and a machine learning model. In some embodiments, system 200 may include a pilot input. A pilot input may be configured to detect an input datum from a pilot. A pilot input may be configured to transmit an input datum to a flight controller. In some embodiments, system 200 may include a flight controller configured to receive an input datum from a pilot input. In some embodiments, system 200 may include generating a throttle datum as a function of a vibration datum and an input datum. In some embodiments, system 200 may include transmitting a throttle datum generated as a function of a vibration datum and an input datum to a propulsor.

Now referring to FIG. 2, a system 200 for vibration monitoring of an electric aircraft 204 is presented. In some embodiments, system 200 may include electric aircraft 204. Electric aircraft 204 may include an eVTOL, unmanned aerial vehicle, and the like. Electric aircraft 204 may be as described above with reference to FIG. 1. In some embodiments, electric aircraft 204 may include propulsor 208. In some embodiments, electric aircraft 204 may include a plurality of propulsors. Propulsor 208 may include a vertical, horizontal, or other propulsor. In some embodiments, propulsor 208 may be configured to convert an electrical energy into a mechanical energy. Propulsor 208 may include an electrical machine that may convert electrical energy into mechanical energy, such as an electric motor. An electric motor may operate through an interaction between the motor's magnetic field and electric current in a wire winding to generate force in the form of torque applied on a shaft of the motor. Electric motors may be powered by direct current (DC) sources, such as from batteries, motor vehicles or rectifiers, or by alternating current (AC) sources, such as a power grid, inverters or electrical generators. An electric generator may include a mechanical design identical to an electric motor, but may operate with a reversed flow of power, converting mechanical energy into electrical energy. Propulsor 208 may include a plurality of individual propulsors. In some embodiments, propulsor 208 may include integrated propulsors such as an electric motor. Propulsor 208 may be mechanically and/or electrically coupled to electric aircraft 204. Propulsor 208 may include a propeller. In some embodiments, propulsor 208 may include a propeller, a blade, and/or any combination thereof.

With continued reference to FIG. 2, system 200 may include sensor 212. In some embodiments, sensor 212 may be configured to measure a vibration datum 220 of propulsor 208. A "vibration datum," as used in this disclosure, is a datum that describes, measures and/or characterizes a vibration of an object or any data associated to the vibration of an object. A "vibration" as used in this disclosure is an oscillation about an equilibrium point of an object. In some embodiments, vibration datum 220 may include data about physical forces acting on propulsor 208. Physical forces may include torque, friction, vibration, and/or acceleration. In some embodiments, a vibration datum 220 may include a distance propulsor 208 is displaced from an equilibrium point. A vibration datum 220 may include a data reading of a 10 cm displacement of propulsor 208 from an origin point. An origin point may include an initial position of propulsor 208. In some embodiments, a vibration datum may include a frequency. A vibration datum 220 may include a frequency of displacement of propulsor 208. In some embodiments, a vibration datum 220 may include a data reading of 800 Hz. In some embodiments, a vibration datum 220 may include a value of revolutions per minute (rpm) of propulsor 208. In some embodiments, a vibration datum 220 may include a data reading of 3000 rpm of propulsor 208. In some embodiments, a vibration datum 220 may include a torque of propulsor 208. In some embodiments, a vibration datum 220 may include a data reading of 200 newton meters. In some embodiments, a vibration datum 220 may include data from an external datum including, but not limited to, wind speed, weather, air pressure, temperature, and/or altitude. In some embodiments, a vibration datum 220 may be calculated as a function of an external datum. Sensor 212 may be configured to transmit vibrational data of propulsor 208 to a flight controller 216. Sensor 212 may be integrated into propulsor 208, a portion thereof, or any subcomponent thereof. Sensor 212 may include circuitry or electronic components configured to digitize, transform, or otherwise manipulate electrical signals. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Sensor 212 may generate vibration datum 220 of propulsor 208. Sensor 212 may include a motion sensor. A "motion sensor", for the purposes of this disclosure, is a device or component configured to detect physical movement of an object or group of objects. One of ordinary skill in the art would appreciate, after reviewing the entirety of this disclosure, that motion may include a plurality of types including, but not limited to, spinning, rotating, oscillating, gyrating, jumping, sliding, reciprocating, or the like. Sensor 212 may include, torque sensor, gyroscope, accelerometer, torque sensor, magnetometer, inertial measurement unit (IMU), pressure sensor, force sensor, proximity sensor, displacement sensor, vibration sensor, among others. Sensor 212 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor. The herein disclosed system and method may comprise a plurality of sensors in the form of individual sensors or a sensor suite working in tandem or individually. A sensor suite may include a plurality of independent sensors, as described herein, where any number of the described sensors may be used to detect any number of physical or electrical quantities associated with an aircraft power system or an electrical energy storage system. Independent sensors may include separate sensors measuring physical or electrical quantities that may be powered by and/or in communication with circuits independently, where each may signal sensor output to a control circuit such as a user graphical interface. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained.

With continued reference to FIG. 2, system 200 may include flight controller 216. Flight controller 216 may include a computing device. In some embodiments, flight controller 216 may include a proportional-integral-derivative (PID) controller. Flight controller 216 may be as described in further detail below with reference to FIG. 3. Flight controller 216 may be coupled to electric aircraft 204. In some embodiments, flight controller 216 may be in electrical communication with sensor 212. In some embodiments, flight controller 216 may be configured to receive vibration data of propulsor 208 from sensor 212. Flight controller 216 may be configured to generate vibration datum 220 of propulsor 208. In some embodiments, vibration datum 220 may include a vibrational intensity of propulsor 208. A vibrational intensity may be measured by an acceleration of propulsor 208. In some embodiments, a vibrational datum may include a vibration amplitude. A vibration amplitude may include a displacement of propulsor 208 from an origin point. An origin point may include a point at which propulsor 208 normally operates at. Vibration datum 220 may include a period of time of vibrational forces acting on propulsor 208. Vibration datum 220 may include data about different vibrational forces acting on different parts of propulsor 208. In a non-limiting example, vibrational datum 220 may detect a vibrational force acting on a stator of propulsor 208 that may be different from a vibrational force acting on a rotor of propulsor 208. In some embodiments, vibration datum 220 may include a history of vibrational forces that may have acted on propulsor 208. Vibration datum 220 may include a vibration threshold of propulsor 208. A vibration threshold may include a vibrational value that may damage propulsor 208. In some embodiments, a vibration threshold may include a resonant frequency of propulsor 208. A "resonant frequency" as used in this disclosure is a phenomenon of increased amplitude that occurs when a frequency of a periodically applied force is equal or close to a natural frequency of the system on which it acts. A vibration acting on propulsor 208 that is close or at a resonant frequency may lead to major physical damage of propulsor 208. A vibration threshold may include a specific vibrational value above or below a resonant frequency of propulsor 208. A specific vibrational value may include a frequency between 1000 Hz to 10 KHz. In some embodiments, a specific vibrational value may include a frequency of 3.6 KHz. In some embodiments, vibration datum 220 may include a plurality of resonant frequencies of a plurality of propulsors. A plurality of resonant frequencies may include resonant frequencies relating to different propulsor sizes, shapes, aerodynamics, materials, or other factors.

In some embodiments, and still referring to FIG. 2, flight controller 216 may be configured to generate throttle datum 224. A "throttle datum," as used in this disclosure, is any datum describing a power input of a propulsor. A power input may include a current and/or voltage delivered to propulsor 208. In some embodiments, a throttle datum may include a torque command of propulsor 208. A torque command may include a command to apply a torque on propulsor 208. In some embodiments, a torque may include 500 newton meters. In some embodiments, a throttle datum may include a rpm value. In some embodiments, a throttle datum may include a value of 9000 rpm of propulsor 208. In some embodiments, flight controller 216 may be configured to generate throttle datum 224 as a function of an input datum from a pilot input. An input datum may include data about a vibration of propulsor 208. Throttle datum 224 may include data regarding a throttle level of propulsor 208. A throttle level may include an input power of propulsor 208 that may be determined by an output power of a throttle. A throttle may include a device that may be configured to dictate a power input of propulsor 208. A throttle may include a mechanical throttle, electrical throttle, and/or a combination thereof. In some embodiments, a throttle may be configured to operate manually. In other embodiments, a throttle may be configured to operate automatically. In some embodiments, a throttle may be configured to be operated by flight controller 216. In some embodiments, a throttle level may correspond to an increase or decrease of a rotational speed of propulsor 208. Throttle datum 224 may include a current throttle level of propulsor 208. In some embodiments, flight controller 216 may modify throttle datum 224 as a function of vibration datum 220. Flight controller 216 may be configured to reduce a throttle level of throttle datum 224 based on an increase in vibrations of vibration datum 220. In some embodiments, flight controller 216 may be configured to increase a throttle level of throttle datum 224 based on a decrease in vibrations of vibration datum 220. In some embodiments, flight controller 226 may update throttle datum 224 based on vibration datum 220 in real time. In some embodiments, flight controller 226 may be configured to predict points in a flight path of an electric aircraft that may have higher than normal vibrational forces. Flight controller 216 may be configured to automatically update throttle datum 224 based on a predicted vibration datum 220 of a specific point in a flight path. A specific point in a flight path may include, but is not limited to, a takeoff procedure, a hovering procedure, a forward flight procedure, a transition between a hovering mode and a forward flight mode, a cruising mode, a transition between a forward flight mode and a hovering mode, and a landing procedure. In some embodiments, throttle datum 224 may be transmitted to propulsor 208. In some embodiments, throttle datum 224 may be transmitted by flight controller 216 to propulsor 208. In some embodiments, throttle datum 224 may be transmitted via a wired connection. In other embodiments, throttle datum 224 may be transmitted via a wireless connection. Throttle datum 224 may include a command for propulsor 204 to increase or decrease a throttle level and therefore a rotational speed of propulsor 208. In some embodiments, flight controller 216 may update throttle datum 224 based on datum from propulsor health database 404 described in further detail below with reference to FIG. 4.

With continued reference to FIG. 2, in an embodiment, flight controller 216 may be configured to modify throttle datum 224 using vibration datum 220 and a machine learning model. A machine learning model may be trained on a set of training data. A set of training data may include a plurality of input data such as, but not limited to, vibration data, propulsor type data, propulsor health data, aircraft type data, flight path data, and/or flight maneuver data. A set of training data may include output data. Output data may include throttle data. In some embodiments, a set of training data may correlate vibration data to throttle data. Vibration data and/or throttle data of a set of training data may be obtained from previous flights measuring vibration data and throttle data. In some embodiments, vibration data and/or throttle data may be obtained from a user input. In some embodiments, flight controller 216, or a remote device, may train a machine learning model using training data as described above. A machine learning model may be trained to output throttle data based on an input of vibration data vibration data, propulsor type data, propulsor health data, aircraft type data, flight path data, and/or flight maneuver data. In some embodiments, flight controller 216 may be configured to utilize a machine learning model to generate a throttle datum. In a non-limiting example, flight controller 216 may be configured to detect a vibration datum of 4 KHz. Flight controller 216 may use a machine learning model to predict an optimal throttle datum. Flight controller 216 may be configured to generate a throttle datum of 100 newton meters based on a throttle datum prediction of a machine learning model.

Figure 3:
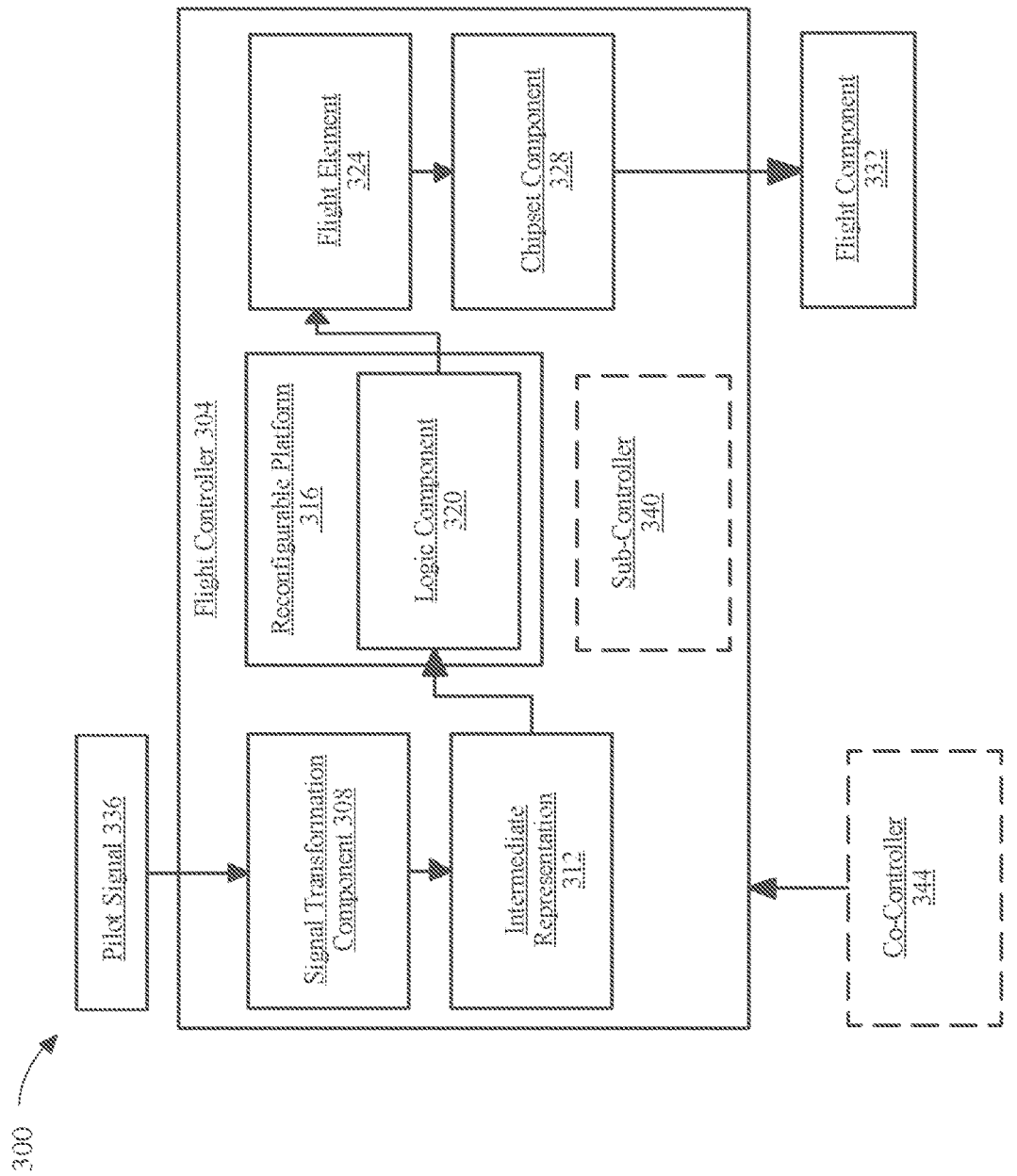
FIG. 3 is a block diagram of a flight controller system.

Now referring to FIG. 3, an exemplary embodiment 300 of a flight controller 304 is illustrated. Flight controller 304 may include a computing device as described in FIG. 7. As used in this disclosure a "flight controller" is a computing device of a plurality of computing devices dedicated to data storage, security, distribution of traffic for load balancing, and flight instruction. Flight controller 304 may include and/or communicate with any computing device as described in this disclosure, including without limitation a microcontroller, microprocessor, digital signal processor (DSP) and/or system on a chip (SoC) as described in this disclosure. Further, flight controller 304 may include a single computing device operating independently, or may include two or more computing device operating in concert, in parallel, sequentially or the like; two or more computing devices may be included together in a single computing device or in two or more computing devices. In embodiments, flight controller 304 may be installed in an aircraft, may control the aircraft remotely, and/or may include an element installed in the aircraft and a remote element in communication therewith.

In an embodiment, and still referring to FIG. 3, flight controller 304 may include a signal transformation component 308. As used in this disclosure a "signal transformation component" is a component that transforms and/or converts a first signal to a second signal, wherein a signal may include one or more digital and/or analog signals. For example, and without limitation, signal transformation component 308 may be configured to perform one or more operations such as preprocessing, lexical analysis, parsing, semantic analysis, and the like thereof. In an embodiment, and without limitation, signal transformation component 308 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 308 may include transforming one or more low-level languages such as, but not limited to, machine languages and/or assembly languages. For example, and without limitation, signal transformation component 308 may include transforming a binary language signal to an assembly language signal. In an embodiment, and without limitation, signal transformation component 308 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 3, signal transformation component 308 may be configured to optimize an intermediate representation 312. As used in this disclosure an "intermediate representation" is a data structure and/or code that represents the input signal. Signal transformation component 308 may optimize intermediate representation as a function of a data-flow analysis, dependence analysis, alias analysis, pointer analysis, escape analysis, and the like thereof. In an embodiment, and without limitation, signal transformation component 308 may optimize intermediate representation 312 as a function of one or more inline expansions, dead code eliminations, constant propagation, loop transformations, and/or automatic parallelization functions.

In another embodiment, signal transformation component 308 may optimize intermediate representation as a function of a machine dependent optimization such as a peephole optimization, wherein a peephole optimization may rewrite short sequences of code into more efficient sequences of code. Signal transformation component 308 may optimize intermediate representation to generate an output language, wherein an "output language," as used herein, is the native machine language of flight controller 304. For example, and without limitation, native machine language may include one or more binary and/or numerical languages.

Still referring to FIG. 3, in an embodiment, and without limitation, signal transformation component 308 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 3, flight controller 304 may include a reconfigurable hardware platform 316. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 316 may be reconfigured to enact any algorithm and/or algorithm selection process received from another computing device and/or created using machine-learning processes.

Still referring to FIG. 3, reconfigurable hardware platform 316 may include a logic component 320. As used in this disclosure a "logic component" is a component that executes instructions on output language. For example, and without limitation, logic component may perform basic arithmetic, logic, controlling, input/output operations, and the like thereof. Logic component 320 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 320 may be organized according to Von Neumann and/or Harvard architecture as a non-limiting example. Logic component 320 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 320 may include one or more integrated circuit microprocessors, which may contain one or more central processing units, central processors, and/or main processors, on a single metal-oxide-semiconductor chip. Logic component 320 may be configured to execute a sequence of stored instructions to be performed on the output language and/or intermediate representation 312. Logic component 320 may be configured to fetch and/or retrieve the instruction from a memory cache, wherein a "memory cache," as used in this disclosure, is a stored instruction set on flight controller 304. Logic component 320 may be configured to decode the instruction retrieved from the memory cache to opcodes and/or operands. Logic component 320 may be configured to execute the instruction on intermediate representation 312 and/or output language. For example, and without limitation, logic component 320 may be configured to execute an addition operation on intermediate representation 312 and/or output language. In an embodiment, and without limitation, logic component 320 may be configured to calculate a flight element 324. As used in this disclosure a "flight element" is an element of datum denoting a relative status of aircraft. For example, and without limitation, flight element 324 may denote one or more torques, thrusts, airspeed velocities, forces, altitudes, groundspeed velocities, directions during flight, directions facing, forces, orientations, and the like thereof. For example, and without limitation, flight element 324 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 324 may denote that aircraft is following a flight path accurately and/or sufficiently.

Still referring to FIG. 3, flight controller 304 may include a chipset component 328. As used in this disclosure a "chipset component" is a component that manages data flow. In an embodiment, and without limitation, chipset component 328 may include a northbridge data flow path, wherein the northbridge dataflow path may manage data flow from logic component 320 to a high-speed device and/or component, such as a RAM, graphics controller, and the like thereof. In another embodiment, and without limitation, chipset component 328 may include a southbridge data flow path, wherein the southbridge dataflow path may manage data flow from logic component 320 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 328 may manage data flow between logic component 320, memory cache, and a flight component 332. As used in this disclosure a "flight component" is a portion of an aircraft that can be moved or adjusted to affect one or more flight elements. For example, flight component 332 may include a component used to affect the aircrafts' roll and pitch which may comprise one or more ailerons. As a further example, flight component 332 may include a rudder to control yaw of an aircraft. In an embodiment, chipset component 328 may be configured to communicate with a plurality of flight components as a function of flight element 324. For example, and without limitation, chipset component 328 may transmit to an aircraft rotor to reduce torque of a first lift propulsor and increase the forward thrust produced by a pusher component to perform a flight maneuver.

In an embodiment, and still referring to FIG. 3, flight controller 304 may be configured generate an autonomous function. As used in this disclosure an "autonomous function" is a mode and/or function of flight controller 304 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 324. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 304 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 304 will control the ailerons and/or rudders. As used in this disclosure "non-autonomous mode" is a mode that denotes a pilot will control aircraft and/or maneuvers of aircraft in its entirety.

In an embodiment, and still referring to FIG. 3, flight controller 304 may generate autonomous function as a function of an autonomous machine-learning model. As used in this disclosure an "autonomous machine-learning model" is a machine-learning model to produce an autonomous function output given flight element 324 and a pilot signal 336 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 336 may denote that a pilot is controlling and/or maneuvering ailerons, wherein the pilot is not in control of the rudders and/or propulsors. In an embodiment, pilot signal 336 may include an implicit signal and/or an explicit signal. For example, and without limitation, pilot signal 336 may include an explicit signal, wherein the pilot explicitly states there is a lack of control and/or desire for autonomous function. As a further non-limiting example, pilot signal 336 may include an explicit signal directing flight controller 304 to control and/or maintain a portion of aircraft, a portion of the flight plan, the entire aircraft, and/or the entire flight plan. As a further non-limiting example, pilot signal 336 may include an implicit signal, wherein flight controller 304 detects a lack of control such as by a malfunction, torque alteration, flight path deviation, and the like thereof. In an embodiment, and without limitation, pilot signal 336 may include one or more explicit signals to reduce torque, and/or one or more implicit signals that torque may be reduced due to reduction of airspeed velocity. In an embodiment, and without limitation, pilot signal 336 may include one or more local and/or global signals. For example, and without limitation, pilot signal 336 may include a local signal that is transmitted by a pilot and/or crew member. As a further non-limiting example, pilot signal 336 may include a global signal that is transmitted by air traffic control and/or one or more remote users that are in communication with the pilot of aircraft. In an embodiment, pilot signal 336 may be received as a function of a tri-state bus and/or multiplexor that denotes an explicit pilot signal should be transmitted prior to any implicit or global pilot signal.

Still referring to FIG. 3, autonomous machine-learning model may include one or more autonomous machine-learning processes such as supervised, unsupervised, or reinforcement machine-learning processes that flight controller 304 and/or a remote device may or may not use in the generation of autonomous function. As used in this disclosure "remote device" is an external device to flight controller 304. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 3, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 304 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 3, flight controller 304 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 304. Remote device and/or FPGA may transmit a signal, bit, datum, or parameter to flight controller 304 that at least relates to autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 304 as a software update, firmware update, or corrected habit machine-learning model. For example, and without limitation autonomous machine learning model may utilize a neural net machine-learning process, wherein the updated machine-learning model may incorporate a gradient boosting machine-learning process.

Still referring to FIG. 3, flight controller 304 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 3, flight controller 304 may include, but is not limited to, for example, a cluster of flight controllers in a first location and a second flight controller or cluster of flight controllers in a second location. Flight controller 304 may include one or more flight controllers dedicated to data storage, security, distribution of traffic for load balancing, and the like. Flight controller 304 may be configured to distribute one or more computing tasks as described below across a plurality of flight controllers, which may operate in parallel, in series, redundantly, or in any other manner used for distribution of tasks or memory between computing devices. For example, and without limitation, flight controller 304 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 3, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 332. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 3, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 304. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 312 and/or output language from logic component 320, wherein output language may include one or more analog-to-digital conversions, low bit rate transmissions, message encryptions, digital signals, binary signals, logic signals, analog signals, and the like thereof described above in detail.

Still referring to FIG. 3, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 3, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 3, flight controller 304 may also be implemented using a "shared nothing" architecture in which data is cached at the worker, in an embodiment, this may enable scalability of aircraft and/or computing device. Flight controller 304 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 3, flight controller may include a sub-controller 340. As used in this disclosure a "sub-controller" is a controller and/or component that is part of a distributed controller as described above; for instance, flight controller 304 may be and/or include a distributed flight controller made up of one or more sub-controllers. For example, and without limitation, sub-controller 340 may include any controllers and/or components thereof that are similar to distributed flight controller and/or flight controller as described above. Sub-controller 340 may include any component of any flight controller as described above. Sub-controller 340 may be implemented in any manner suitable for implementation of a flight controller as described above. As a further non-limiting example, sub-controller 340 may include one or more processors, logic components and/or computing devices capable of receiving, processing, and/or transmitting data across the distributed flight controller as described above. As a further non-limiting example, sub-controller 340 may include a controller that receives a signal from a first flight controller and/or first distributed flight controller component and transmits the signal to a plurality of additional sub-controllers and/or flight components.

Still referring to FIG. 3, flight controller may include a co-controller 344. As used in this disclosure a "co-controller" is a controller and/or component that joins flight controller 304 as components and/or nodes of a distributer flight controller as described above. For example, and without limitation, co-controller 344 may include one or more controllers and/or components that are similar to flight controller 304. As a further non-limiting example, co-controller 344 may include any controller and/or component that joins flight controller 304 to distributer flight controller. As a further non-limiting example, co-controller 344 may include one or more processors, logic components and/or computing devices capable of receiving, processing, and/or transmitting data to and/or from flight controller 304 to distributed flight control system. Co-controller 344 may include any component of any flight controller as described above. Co-controller 344 may be implemented in any manner suitable for implementation of a flight controller as described above.

In an embodiment, and with continued reference to FIG. 3, flight controller 304 may be designed and/or configured to perform any method, method step, or sequence of method steps in any embodiment described in this disclosure, in any order and with any degree of repetition. For instance, flight controller 304 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4:
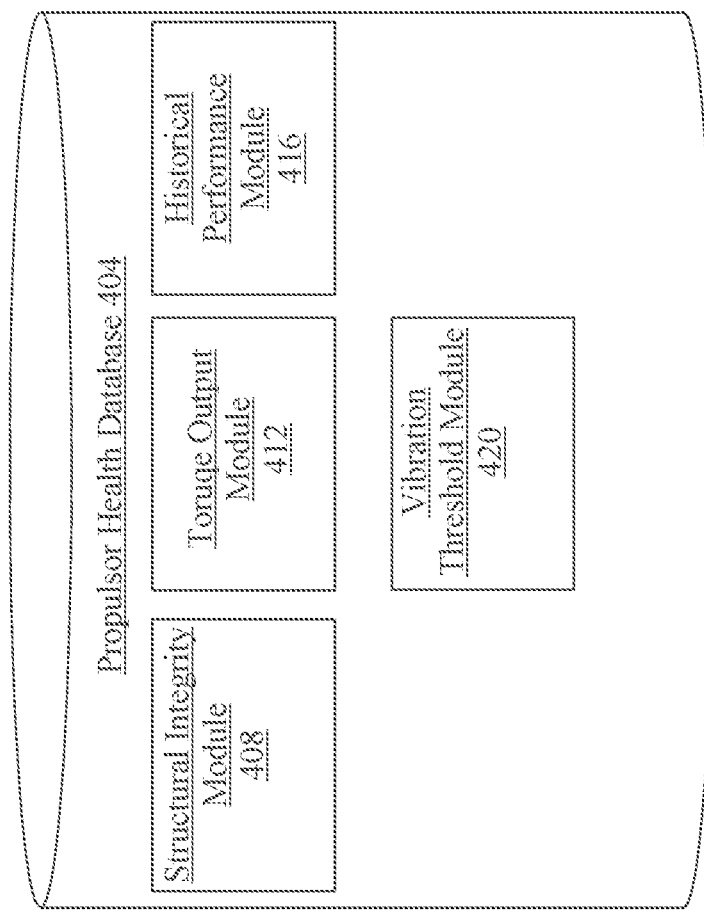
FIG. 4 is a block diagram of an exemplary embodiment of a propulsor health database.

Referring now to FIG. 4, an exemplary embodiment of a propulsor health database 404 is presented. Propulsor health database 404 may include any data structure for ordered storage and retrieval of data, which may be implemented as a hardware or software module. Propulsor health database 404 may be implemented, without limitation, as a relational database, a key-value retrieval datastore such as a NOSQL database, or any other format or structure for use as a datastore that a person skilled in the art would recognize as suitable upon review of the entirety of this disclosure. In some embodiments, propulsor health database 404 may be configured to include a plurality of health measurements of a propulsor. Propulsor health database 404 may be configured to communicate with a flight controller of an electric aircraft. In some embodiments, propulsor health database 404 may be configured to remotely communicate with an electric aircraft. In some embodiments, propulsor health database 404 may be configured to be an on-board storage system of an electric aircraft. Propulsor health database 404 may be configured to receive data from an external computing device. In some embodiments, propulsor health database 404 may receive data about a propulsor from an external computing device. In some embodiments, propulsor health database 404 may be configured to update data stored based on an input from an external computing device. In some embodiments, propulsor health database 404 may be configured to be displayed on a display screen. In some embodiments, a display screen may include a screen of a cockpit of an electric aircraft. In other embodiments, a display screen may include a GUI of a pilot device. In some embodiments, propulsor health database 404 may be configured to be displayed on an external display such as, but not limited to, a base command computing device.

Still referring to FIG. 4, propulsor health database 404 may include a plurality of modules. A module may include a subset of data relating to propulsor health. In some embodiments, propulsor health database 404 may include structural integrity module 408. Structural integrity module 408 may include data about a structural integrity of a propulsor. Structural integrity data may include data regarding a mechanical strength of a propulsor. In some embodiments, structural integrity data may include data about a deformation of a propulsor. Structural integrity module 408 may include data about a plurality of components of a propulsor. A plurality of components may include, but is not limited to, a blade, rotor, stator, power unit, and the like. In a non-limiting example, structural integrity module 408 may include data showing a stator is operating at 100% structural integrity while a rotor is operating at 86% structural integrity. Structural integrity data may include data about a structural failing of a propulsor. A structural failing of a propulsor may include a deformation of a propulsor to a point at which the propulsor no longer can operate as intended. In a non-limiting example, a propulsor may fail structurally if it is damaged enough to reduce thrust generation partially or completely. In some embodiments, structural integrity module 408 may include an integrity percentage of a propulsor. In a non-limiting example, structural integrity module 408 may include data showing a propulsor is at 97% structural integrity.

Still referring to FIG. 4, propulsor health database 404 may include a torque output module 412. Torque output module 412 may include a torque output of a propulsor. A torque output may include a torque generated by a propulsor. In some embodiments, torque output module 412 may include an ideal operational torque. An ideal operational torque may include a torque that a propulsor may ideally output during flight operations. Torque output module 412 may include a current torque output of a propulsor. In some embodiments, torque output module 412 may include a difference between a current torque of a propulsor and an ideal torque of a propulsor. A difference between a current torque and an ideal torque may be indicative of damage to a propulsor. In a non-limiting example, torque output module 412 may show a propulsor may be outputting only 72% of an ideal torque output. In this example, a reduction in torque output may be indicative of propulsor damage. In some embodiments, torque output module 412 may include data about a torque output of a propulsor at specific points of operation of an electric aircraft. In a non-limiting example, torque output module 412 may show a torque output of a propulsor during a takeoff maneuver of an electric aircraft. Torque output module 412 may include an ideal torque output of a propulsor during a takeoff maneuver of an electric aircraft. In other embodiments, torque output module 412 may include an ideal torque output of zero torque based on propulsor type and operation of an electric aircraft. In a non-limiting example, a forward propulsor may ideally have close to zero torque during a liftoff operation of an electric aircraft. Torque output module 412 may show a forward propulsor is generating a forward thrust during a liftoff operation of an electric aircraft which may be indicative of a health problem of the forward propulsor.

Still referring to FIG. 4, in some embodiments, propulsor health database 404 may include a historical performance module 416. Historical performance module 416 may include a plurality of propulsor performance metrics previously measured. A plurality of propulsor performance metrics may include, but is not limited to, output torque, power output, power input, rotational speed, and/or other metrics. Historical performance module 416 may include metrics on how a propulsor performed during different flight maneuvers of an electric aircraft. In a non-limiting example, historical performance module 416 may include a performance history of a vertical propulsor during a liftoff operation of an electric aircraft. Historical performance module 416 may show that a vertical propulsor has historically operated ideally during a liftoff operation of an electric aircraft. In other embodiments, historical performance module 416 may show a vertical propulsor has performed beneath ideal values during a liftoff operation of an electric aircraft. Historical performance module 416 may include a history of performances of a plurality of propulsors. A plurality of propulsors may include propulsor types, sizes, shapes, material, and/or other propulsor elements. In some embodiments, historical performance module 416 may be configured to include data regarding a structural integrity of a propulsor under varying vibrational thresholds. In a non-limiting example, historical performance module 416 may show a propulsor maintains a structural integrity percentage of at least 80% while withstanding vibrational forces close or equal to a vibrational threshold. In another non-limiting example, historical performance module 416 may show a propulsor has a structural integrity percentage of 45% above a vibrational threshold. Historical performance module 416 may be configured to predict a performance of a propulsor based on a history of performance data of the propulsor.

Still referring to FIG. 4, propulsor health database 404 may include vibration threshold module 420. Vibration threshold module 420 may include a vibrational intensity, frequency, and/or other vibration metric. Vibration threshold module 420 may include a specific vibrational value of a propulsor that would cause damage to the propulsor. In some embodiments, vibrational threshold module 420 may include a resonant frequency of a propulsor. In some embodiments, vibrational threshold module 420 may include a plurality of resonant frequencies of a plurality of propulsors. In some embodiments, vibration threshold module 420 may be configured to update a specific vibrational threshold value based on other modules in propulsor health database 404. In some embodiments, vibration threshold module 420 may be updated based on a datum of structural integrity module 408. In a non-limiting example, structural integrity module 408 may indicate a propulsor is withstanding higher than normal vibrational forces without suffering mechanical damage. In such a case, vibration threshold module 420 may be updated to include a higher specific vibrational threshold value of a propulsor. Continuing this example, structural integrity module 408 may indicate a propulsor is suffering mechanical damage at a lower vibrational force than normal. In this case, vibration threshold module 420 may update a specific vibrational threshold value to be lower in order to account for the data from structural integrity module 408. In other embodiments, vibration threshold module 420 may be updated based on a propulsor type, size, shape, material, and/or other propulsor elements. In some embodiments, vibration threshold module 420 may be updated based on historical performance module 416. In a non-limiting example, vibration threshold module 420 may include an initial vibrational threshold value for a specific propulsor. Historical performance module 416 may show that a propulsor has historically performed better or worse and may need a higher or lower vibrational threshold value. Vibration threshold module 420 may updated a specific vibrational threshold based on data from historical performance module 416.

Figure 5:
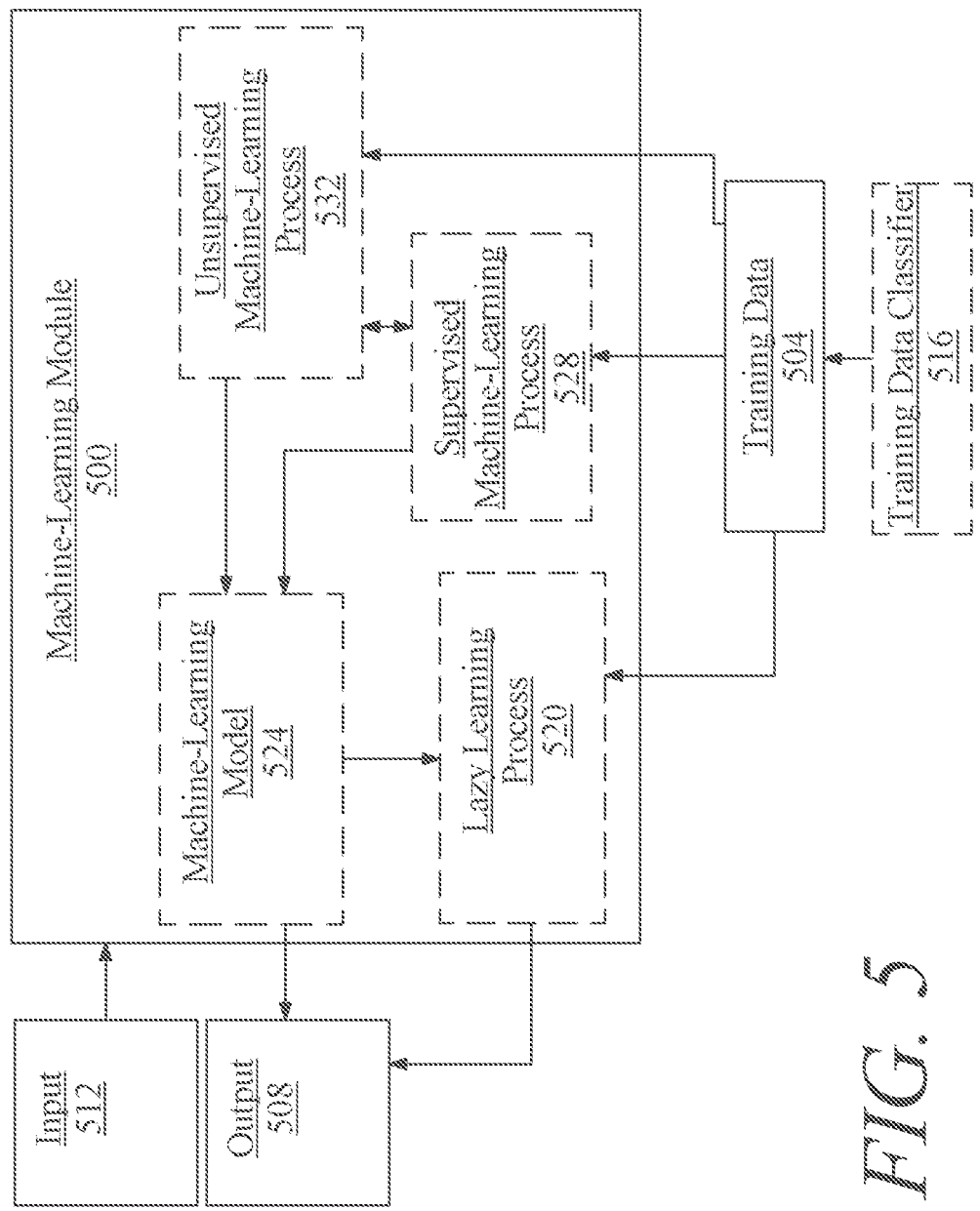
FIG. 5 is an exemplary embodiment of a machine learning system.

Referring now to FIG. 5, an exemplary embodiment of a machine-learning module 500 that may perform one or more machine-learning processes as described in this disclosure is illustrated. A flight controller may utilize machine-learning module 500 to predict a vibrational threshold of a propulsor, propulsor performance, and throttle levels of a propulsor that may reduce damage to a propulsor. In some embodiments, a flight controller may utilize machine-learning module 500 that may be trained with data from propulsor health database 404. Machine-learning module 500 may perform determinations, classification, and/or analysis steps, methods, processes, or the like as described in this disclosure using machine learning processes. A "machine learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example flight elements and/or pilot signals may be inputs, wherein an output may be an autonomous function.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data to sub-categories of flight elements such as torques, forces, thrusts, directions, and the like thereof.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 6:
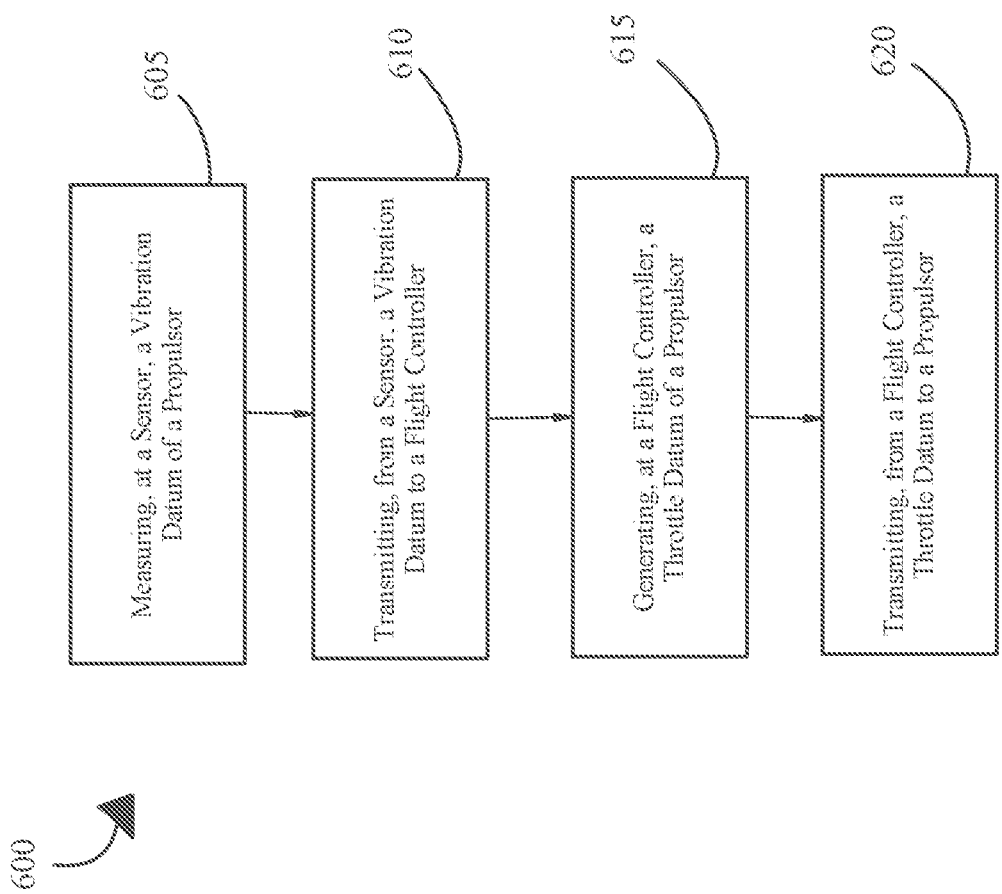
FIG. 6 is a flowchart of an exemplary embodiment of a method of propulsor management.

Now referring to FIG. 6, a method 600 of vibration monitoring of an electric aircraft is presented. In some embodiments, an electric aircraft may include an eVTOL. At step 605, a vibration datum of a propulsor is measured. A vibration datum may include data measured and/or detected regarding a vibration of an object. A vibration may include a displacement of an object with reference to an origin point. In some embodiments, a vibration may include a frequency. In some embodiments, a vibration datum may be measured by a sensor. In some embodiments, a sensor may include an inertial measurement unit, accelerometer, or other sensor. A sensor may be configured to be coupled to a propulsor. In some embodiments, a vibration datum may include a plurality of physical forces acting on a propulsor. In some embodiments, a vibration datum may include a vibrational intensity. A vibrational intensity may include a distance a propulsor is displaced from an origin point. In some embodiments, a vibration datum may include a vibrational frequency. In some embodiments, a vibration datum may include a period of time of vibrational forces acting on a propulsor. In some embodiments, a vibration datum may include data about different vibrational forces acting on different parts of a propulsor. In some embodiments, a vibration datum may include a vibration threshold of a propulsor. A vibration threshold may include a vibrational value that may damage a propulsor. In some embodiments, a vibration threshold may include a resonant frequency of a propulsor. A vibration acting on a propulsor that is close or at a resonant frequency may lead to major physical damage of the propulsor. A vibration threshold may include a specific vibrational value above or below a resonant frequency of a propulsor. In some embodiments, vibration datum measurement may be as described in FIG. 2.

Still referring to FIG. 6, at step 610 a vibration datum is transmitted to a flight controller. A flight controller may be configured to receive a vibration datum from a sensor. In some embodiments, a flight controller may receive a vibration datum from a sensor wirelessly. In other embodiments, a flight controller may receive a vibration datum from a sensor through a wired connection. In some embodiments, a flight controller may be configured to store and update a database of vibration datum. A flight controller may be as described in detail with reference to FIG. 3. A database may be as described in detail with reference to FIG. 4.

Still referring to FIG. 6, at step 615 a throttle datum of a propulsor is generated. Throttle datum may include data regarding a throttle level of a propulsor. A throttle level may include an input power of a propulsor that may be determined by a throttle. A throttle may include a device that may be configured to dictate a power input of a propulsor. A power input may include a voltage, current, torque, rpm, or other element relating to electromechanical power. In some embodiments, a throttle may be configured to operate manually. In other embodiments, a throttle may be configured to operate automatically. In some embodiments, a throttle may be configured to be operated by a flight controller. In some embodiments, a throttle level may correspond to an increase or decrease of rotational speed of a propulsor. In some embodiments, a throttle datum may include a current throttle level of a propulsor. In some embodiments, a flight controller may generate a throttle datum as a function of a vibration datum. In some embodiments, a flight controller may be configured to reduce a throttle level of a throttle datum based on an increase in vibrations of a vibration datum. In some embodiments, a flight controller may be configured to increase a throttle level of a throttle datum based on a decrease in vibrations of a vibration datum. In some embodiments, a flight controller may update a throttle datum based on a vibration datum in real time. In some embodiments, a flight controller may be configured to generate a throttle datum as a function of a vibration datum and a machine learning model. In some embodiments, a throttle datum may be generated from a pilot input. A pilot input may include an input datum from a pilot. A pilot input may be configured to transmit an input datum to a flight controller. In some embodiments, a flight controller may be configured to receive an input datum from a pilot input. In some embodiments, a flight controller may be configured to generate a throttle datum as a function of a vibration datum and an input datum. In some embodiments, generating a throttle datum may be as described in FIG. 2.

Still referring to FIG. 6, at step 620, a throttle datum is transmitted to a propulsor. In some embodiments, a throttle datum may be transmitted to propulsor. In some embodiments, throttle datum may be transmitted by flight controller to propulsor. In some embodiments, throttle datum 224 may be transmitted via a wired connection. In other embodiments, throttle datum may be transmitted via a wireless connection. Throttle datum may include a command for propulsor to increase or decrease a throttle level and therefore a rotational speed of propulsor. In some embodiments, a propulsor may be configured to adjust a throttle as a function of the throttle datum received. In some embodiments, transmitting a throttle datum may be as described in FIG. 2.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
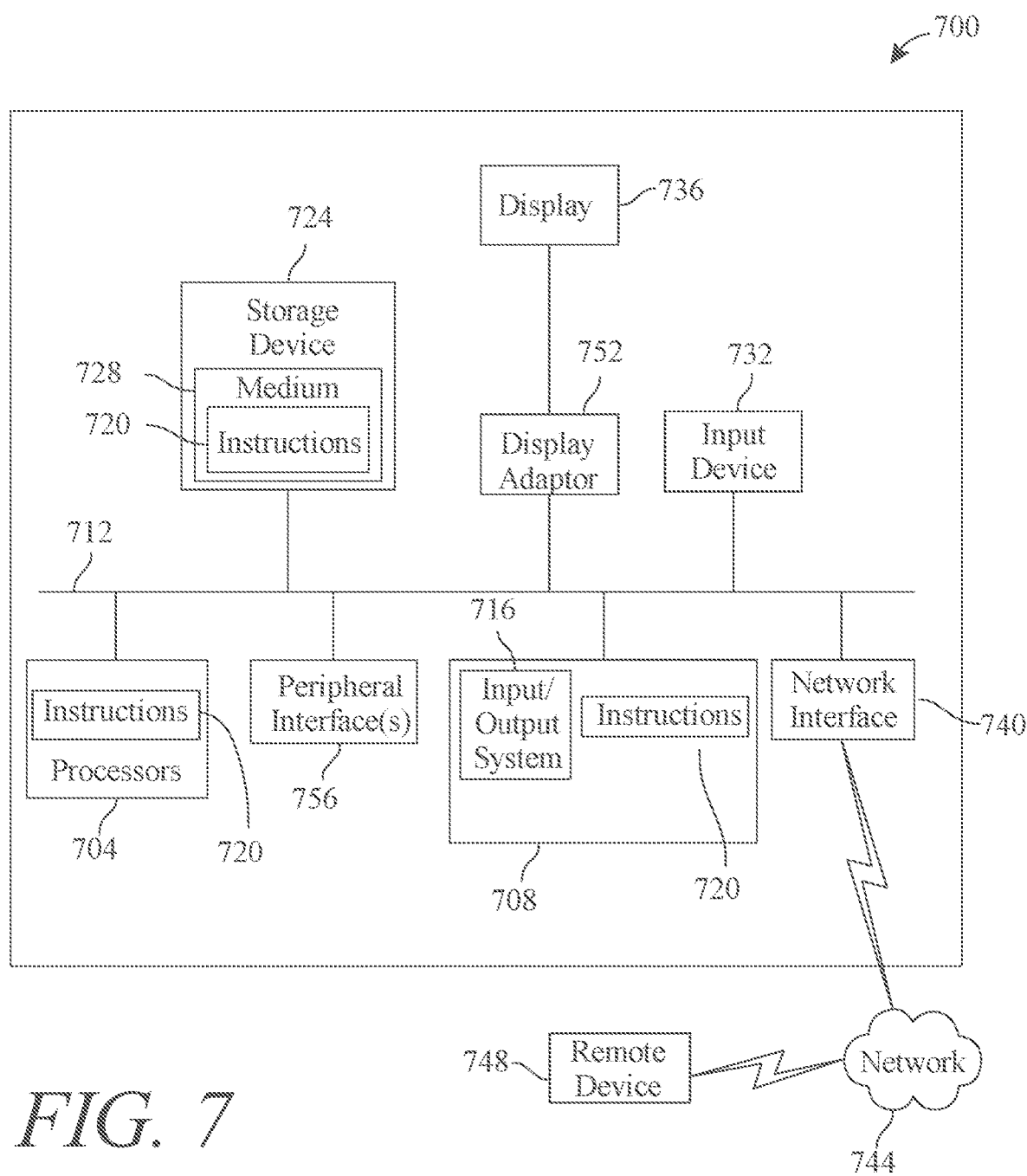
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. In some embodiments, computer system 700 may include a flight controller as described above with respect to FIG. 3. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for vibration monitoring of an electric aircraft, comprising:
   a sensor coupled to a propulsor of an electrical aircraft, wherein the sensor is configured to:
   measure a vibration datum of the propulsor; and
   transmit the vibration datum to a flight controller; and
   a flight controller, wherein the flight controller is configured to:
   receive the vibration datum from the sensor;

receive training data, wherein the training data comprises at least a structural integrity datum correlated to at least a vibration datum;

train a machine learning module as a function of the training data;

output a vibrational threshold as a function of the machine learning model, wherein the machine learning model is further configured to receive the vibration datum as input;

generate a throttle datum as a function of the vibration datum and the vibrational threshold; and transmit the throttle datum to the propulsor.

2. The system of claim 1, wherein transmitting the throttle datum to the propulsor includes a propulsor receiving the throttle datum and adjusting a throttle level of as a function of the throttle datum.

3. The system of claim 1, wherein the electric aircraft includes an electric vertical takeoff and landing (eVTOL) aircraft.

4. The system of claim 1, wherein the vibration datum includes physical force data.

5. The system of claim 4, wherein the vibration datum includes a frequency datum.

6. The system of claim 5, wherein the flight controller is configured to generate the throttle datum as a function of the frequency datum.

7. The system of claim 1, wherein the flight controller further comprises a vibration threshold module.

8. The system of claim 7, wherein the vibration threshold module is configured to update at least a specific vibration threshold for the propulsor.

9. The system of claim 8, wherein the vibration threshold module is further configured to update the at least a specific vibration threshold as a function of data from a historical performance module.

10. The system of claim 1, wherein the system further comprises:

a pilot input, wherein the pilot input is configured to:
  detect the at least an input datum from a pilot; and
  transmit the at least an input datum to the flight controller.

11. The system of claim 10, wherein the flight controller is further configured to:

receive the at least an input datum from the pilot input;
generate the throttle datum as a function of the vibration datum and the at least an input datum; and
transmit the throttle datum to the propulsor.

12. A method of vibration monitoring of an electric aircraft, comprising:

measuring, at a sensor, a vibration datum of a propulsor;

transmitting, from the sensor, the vibration datum to a flight controller;

receiving, at the flight controller, training data, wherein the training data comprises at least a structural integrity datum correlated to at least a vibration datum;

training, at the flight controller, a machine learning module as a function of the training data;

outputting, at the flight controller, a vibrational threshold as a function of the machine learning model, wherein the machine learning model is further configured to receive the vibration datum as input;

generating, at the flight controller, a throttle datum of a propulsor as a function of the vibration datum and the vibrational threshold; and transmitting, from the flight controller, the throttle datum to the propulsor.

13. The method of claim 12, wherein transmitting the throttle datum to the propulsor includes a propulsor receiving the throttle datum and adjusting a throttle level of as a function of the throttle datum.

14. The method of claim 12, wherein the vibration datum includes a frequency datum.

15. The method of claim 14, wherein the flight controller is configured to generate the throttle datum as a function of the frequency datum.

16. The method of claim 12, wherein the flight controller further comprises a vibration threshold module.

17. The method of claim 16, wherein the vibration threshold module is configured to update at least a specific vibration threshold for the propulsor.

18. The method of claim 17, wherein the vibration threshold module is configured to is further configured to update the at least a specific vibration threshold as a function of data from a historical performance module.

19. The method of claim 12, wherein the system further comprises:

a pilot input, wherein the pilot input is configured to:
  detect the at least an input datum from a pilot; and
  transmit the at least an input datum to the flight controller.

20. The method of claim 19, wherein the flight controller is further configured to:

receive the at least an input datum from the pilot input;
generate the throttle datum as a function of the vibration datum and the at least an input datum; and
transmit the throttle datum to the propulsor.

* * * * *